United States Patent [19]

Radcliffe

[11] 4,455,883
[45] Jun. 26, 1984

[54] COMBINED SHIFT CONTROL

[75] Inventor: Thomas R. Radcliffe, Atherton, England

[73] Assignee: Eaton Corporation, Cleveland, Ohio

[21] Appl. No.: 268,413

[22] Filed: May 29, 1981

[30] Foreign Application Priority Data

Nov. 14, 1980 [GB] United Kingdom ................ 8036599

[51] Int. Cl.³ .......................... G05G 9/14; G05G 5/10
[52] U.S. Cl. ..................................... 74/475; 74/473 R
[58] Field of Search ..................... 74/473 R, 475, 745, 74/740

[56] References Cited

U.S. PATENT DOCUMENTS

| 2,027,442 | 1/1936 | Lapsley | 74/475 |
| 2,301,448 | 11/1942 | Peterson et al. | 74/473 |
| 2,425,204 | 8/1947 | Peterson et al. | 74/475 |
| 2,948,370 | 8/1960 | Winther et al. | 192/4 |
| 2,971,393 | 2/1961 | Bartholomew | 74/336.5 |
| 3,146,842 | 9/1964 | Nelson et al. | 180/22 |
| 3,265,173 | 8/1966 | Russell | 192/67 |
| 3,297,052 | 1/1967 | Robinson | 137/625.21 |
| 3,368,638 | 2/1968 | Terry et al. | 180/22 |
| 3,373,831 | 3/1968 | Terry et al. | 180/22 |
| 3,429,202 | 2/1969 | Galicher | 74/473 |
| 3,866,488 | 2/1975 | Nakata et al. | 74/475 |
| 3,939,724 | 2/1976 | Takahashi et al. | 74/475 |
| 4,273,004 | 6/1981 | Morrison et al. | 74/473 R |
| 4,275,612 | 6/1981 | Silvester | 74/473 R |
| 4,305,309 | 12/1981 | Ookubo et al. | 74/473 R |

Primary Examiner—Allan D. Herrmann
Assistant Examiner—Joseph M. Rolnicki
Attorney, Agent, or Firm—C. H. Grace; H. D. Gordon

[57] ABSTRACT

A combined shift control for a motor vehicle driveline comprising a change speed gear transmission and a two speed axle whereby, for instance, a five speed gear box with one reverse gear is effectively extended to provide a seven speed driveline with one reverse gear. The gear box includes three parallel shift rods (12, 13, 14) each carrying a respective selector block (15, 16, 17). The slot (18) of the fourth/fifth selector block (17) is deeper than usual so that the gear lever (21) can operate it in two different transverse positions. In the first position the gear lever (21) actuates the fourth and fifth gears, but in the second position, after overcoming a spring-loaded plunger (20) and operating two micro-switches (24) which serve to change the axle ratio to a higher value, the gear lever (21) effectively actuates two further driveline speeds (sixth/seventh) when selector block 17 is caused to move the shift rod 14 to engage fourth and fifth transmission gears again. In order to retain the gear lever (21) in the high axle ratio position when the driver lets go of the lever means such as a slidable gate (22) which is locked into position when the high axle ratio is selected via the micro-switches (24) are provided. Alternate forms of switch and retaining means are described with reference to other Figures. An embodiment is disclosed in (FIGS. 12, 13) for use with a selector finger mounted on a cross shaft rather than a pivotable gear lever of FIG. 4.

8 Claims, 14 Drawing Figures

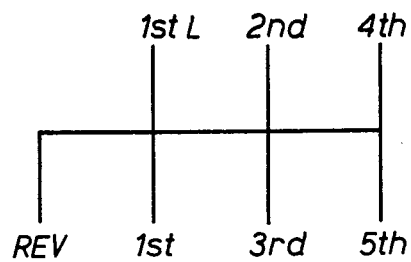
FIG./.
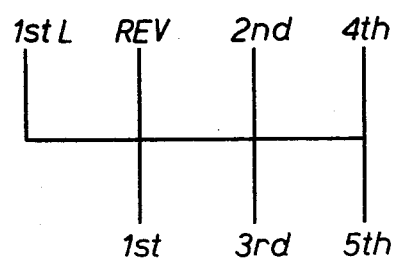
FIG.2.
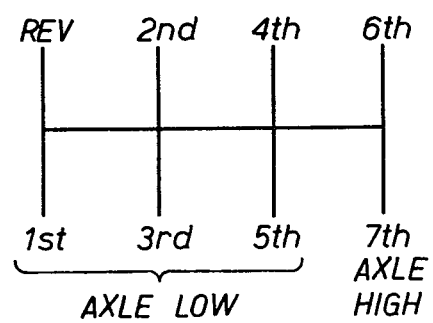
FIG.3.
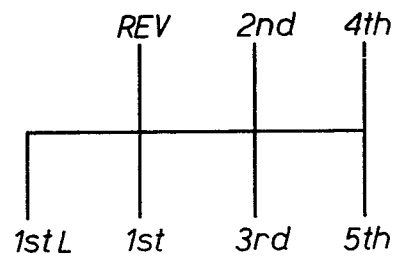
FIG./4.

COMBINED SHIFT CONTROL

BACKGROUND OF THE INVENTION

1. Field of the Invention

This present invention relates to a combined shift control for a change speed gear transmission and a two speed axle for motor vehicles.

2. Description of the Prior Art

Shift controls are known for vehicles having a two speed axle by which the number of available driveline speeds can be doubled from the number of speeds provided by the transmission. Thus a driveline with a change speed gear transmission with, for example, four forward and one reverse speed may, with the provision of a two speed axle, be doubled to provide a total of eight forward speeds, a reverse speed, and a creep gear. The prior art controls typically utilized a shift lever or the like to control the transmission and a separate lever, rotary valve or button control to control the two speed axle.

SUMMARY OF THE INVENTION

According to the present invention there is provided a combined shift control for a change speed gear transmission and a two speed axle for motor vehicles, comprising a gear transmission casing, at least two parallel shift rods each shiftable axially in the casing to select a gear ratio or gear ratios of the transmission, a selector finger and switch means, mounted in the casing, adapted to change the axle ratio between high and low values, wherein each shift rod carries a respective selector block having engagement faces engageable by the selector finger to axially shift the shift rods, wherein one selector block is such that the selector finger can occupy a first or a second operational position with respect thereto, and wherein movement of the selector finger between the two operational positions is effective to automatically control the switch means to change the axle ratio whereby the number of driveline gear ratios effectively selectable by the one selector block is increased by one or two.

The invention may be applied to pivotally mounted selector fingers or selector fingers mounted on a cross shaft. In the case of a pivotally mounted selector finger the one selector block may include a spring-loaded plunger which must be overcome before the axle ratio is changed, thus enabling the position of the gear lever in its gate to be clearly recognizable.

Preferably means are provided to retain the selector finger in the axle ratio changed position so that the gear lever will not move back to the other axle ratio position when the driver lets go of the gear lever. Such means may comprise a gate plate which is adapted to slide in the casing with the selector finger upon movement thereof, when the axle ratio is that associated with the first operational position, and arranged to be locked in position in the casing when the selector finger is in the second operational position. The selector finger is then trapped between the spring-loaded plunger and an axially extending face of the gate plate. The locking may be achieved by a solenoid plunger which is also actuated by the switch means.

The switch means may comprise a pair of micro-switches, or a single plunger actuated switch.

Other selector finger retaining means are possible, for example, a pivotal elongate spring clip through which the selector finger extends and which has to be driven up a first ramp or a ramp member, on which it is then retained, when the selector finger is moved to the second operational position. In order to return to the first operational position the selector finger has to be moved with sufficient force to drive the spring clip up another ramp and off the ramp member.

In the case of a selector finger mounted on a cross shaft the switch means can be actuated upon axial movement of the cross shaft when a formation carried thereon serves to operate a plunger of the switch means. Means for retaining the selector finger in the second operational position may comprise spring-loaded detent means carried by the casing and adapted to be overcome by a cam surface carried by the cross shaft upon axial movement thereof.

It is an object of the present invention to provide a combined shift control for a change speed gear transmission and a two speed axle whereby the number of driveline gear speeds, or ratios, available is increased but not doubled in order to extend the effective range of the gear box.

This and other objects and advantages of the present invention will become apparent from a reading of the descriptions of the preferred embodiment taken in view of the attached drawings.

BRIEF DESCRIPTION OF THE DRAWINGS

FIG. 1 shows a first possible shift pattern for a driveline comprising a five speed gear box and a two speed axle;

FIG. 2 shows a second possible shift pattern;

FIG. 3 shows a third possible shift pattern;

FIG. 14 shows a further possible shift pattern.

DESCRIPTION OF THE PREFERRED EMBODIMENT

The term driveline as used herein shall refer to the various components of a vehicle interposed the prime mover, usually a gasoline or diesel engine, and the driven wheels. The driveline usually comprises a clutch or torque converter, a change speed transmission, a drive shaft and one or more axles. The axles may be single speed or multiple speed devices. Various devices such as tandem axle torque dividers, transfer cases or the like may also be included in the driveline. The specific configuration of the driveline, other than the inclusion of a change speed transmission and a two speed axle, forms no part of the present invention.

There are various ways in which, for example, a five speed change speed gear transmission or gear box can be combined with a two speed axle which is not employed for all gear speeds. Some of these ways cause constructional and operational complications. If, as indicated in FIG. 1, a first gear is used with a low axle ration (1st L) and then first to fifth gears (1st, 2nd, 3rd, 4th, 5th) are used with a high axle ratio, this would necessitate extensive changes in a standard five speed gear box and/or shift bar housing assembly and require a toggle for reverse selection. In addition it would be necessary to move the gear lever from 1st L to 1st without moving the gear but operating the axle change, which would be extremely difficult to achieve.

Alternatively, the shift pattern could be as shown in FIG. 2, which would simplify the changes in the gearbox shift bar housing in comparison with the FIG. 1 arrangement, but this is a very complicated shift pattern.

A very much simpler gearbox shift bar housing assembly modification involves the shift pattern shown in FIG. 3 and facilitates an additional axle ratio to be used in combination with two rather than one transmission speed. In FIG. 3 the reverse and the first to fifth speed transmission gears are employed with a low axle ratio, and two further driveline speeds, sixth and seventh, are obtained by selecting the fourth and fifth gears in the transmission again but with a higher axle ratio. When moving from fifth to sixth speed the high axle ratio is automatically selected. It remains selected when moving from sixth to seventh speed, and the low axle ratio is only reselected when moving the gear lever back to the neutral position associated with first to fifth speeds.

Various arrangements suitable for one form of embodiment are shown in FIGS. 4 to 11.

Figure 4:
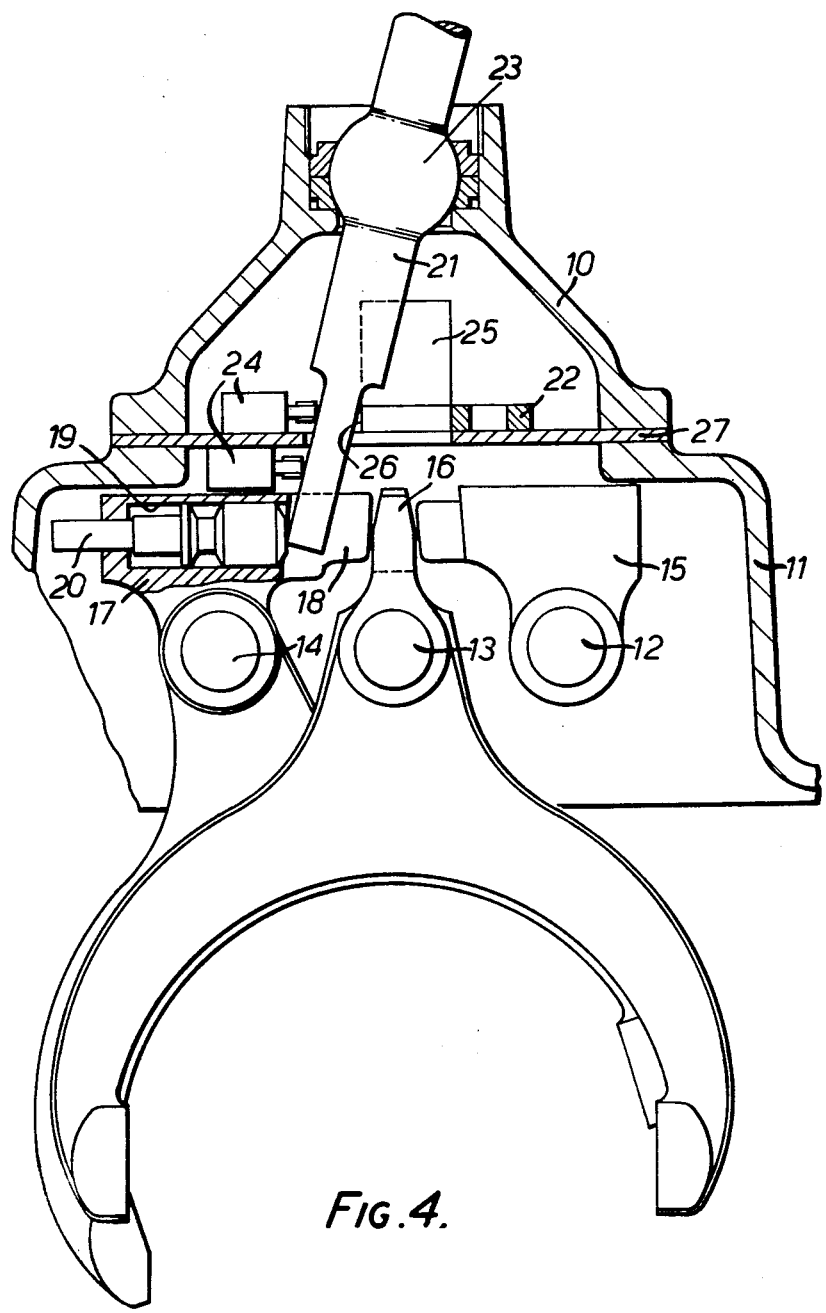
FIG. 4 shows a cross-section of a first embodiment of a combined shift control for a change speed gear transmission and a two speed axle in accordance with the present invention.
Figure 5:
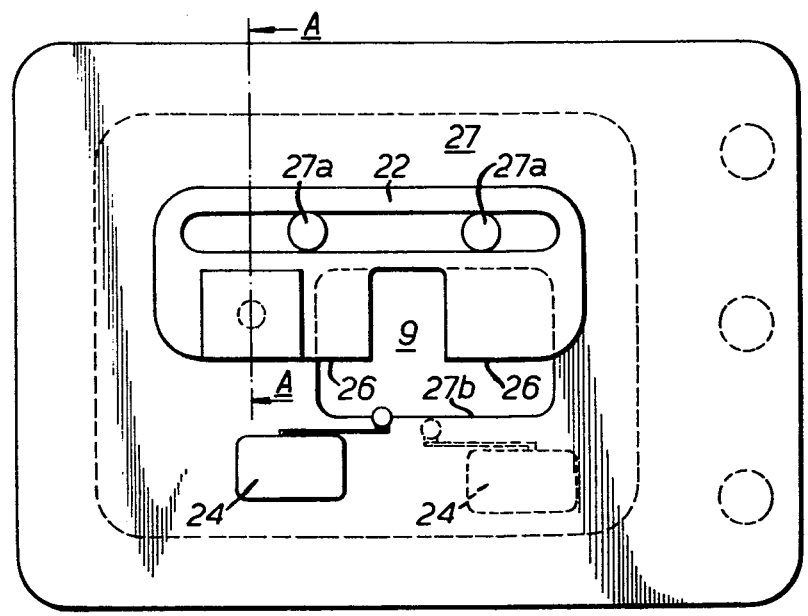
FIG. 5 shows a plan view of a sliding gate of FIG. 4.
Figure 6:
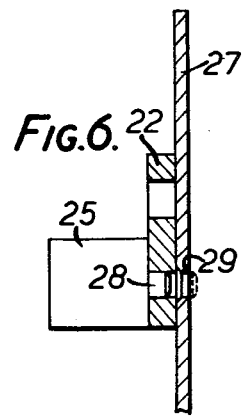
FIG. 6 shows a partial section taken along line AA of FIG. 5.

In FIG. 4 is shown a shift control having a casing comprising a control housing 10 and a shift rod or shift bar housing 11 which houses three parallel shift rods 12, 13, and 14 disposed in a common horizontal plane. The shift rods are mounted for axial sliding movement and each shift rod is shiftable axially in the housing 11 in opposite directions from a neutral position to select either one of two gears of the main transmission. Shift rod 12 carries a conventional first/reverse gear selector block 15. Shift rod 13 carries a conventional second/third gear selector block 16. Shift rod 14 carries a fourth/fifth/sixth/seventh driveline speed selector block 17 which differs from a conventional fourth/fifth gear selector block in that gear lever slot 18 is deeper (i.e. wider) than normal.

Selector block 17 includes a bore 19 in which is arranged a spring-loaded plunger 20. The slot 18 allows additional sideway movement of a selector finger or gear lever 21 in comparison with a conventional gear block by virtue of being deeper, and the spring-loaded plunger 20 enables the position of the gear lever in the gate to be easily recognizable. The gear lever 21 includes a ball portion 23 retained, with provision for pivotal movement in the control housing 10. The gear lever 21 may thus occupy either of two transverse positions relative to block 17.

After changing gear from first through to fifth gear in the conventional manner, gear lever 21 is returned to neutral and pressed sideways against the spring-loaded plunger 20 until it reaches the bottom of slot 18. So moving the gear lever 21 operates two micro-switches 24 arranged on opposite sides of a suitably apertured (at 27b) mounting plate 27, which actuates a rear axle ratio change by, for example, de-energizing one field and energizing the other field of a two-field axle shift unit electric motor. When the gear lever 21 is moved forward again, pivoting around the bearing for ball portion 23 the selector block 17 is moved to the rear and engages the fourth gear again. Movement of the gear lever 21 backwards will engage fifth gear again. Since however, the axle ratio has been changed the engagement of fourth and fifth gear provides a sixth and seventh driveline speed or ratio and is now equivalent to engagement of sixth and seventh gears.

Two micro-switches 24 are employed to ensure that a respective one is depressed, thus operating the axle change and holding it, at all times when sixth or seventh speeds are selected. Since when sixth and seventh speeds are selected the gear lever 21 is pressed to the bottom of slot 18 against spring-loaded plunger 20, it is necesary to provide a means of retaining the plunger in the depressed state when a gear has been selected and the driver has released the gear lever. This may be achieved by arranging that a gate plate 22 slides axially with the gear lever in first to fifth gears and reverse gear on the mounting plate 27, the gear lever being engaged in notch 9 of sling gate plate 22 during these movements, but when the lever is returned to neutral for the change from fifth to sixth speed the gate plate 22 is then locked in position on the mounting plate 27 by a solenoid 25 operated by the micro-switches 24. The plate 22 is confined to axial movement by locating studs 27a provided on the mounting plate 27. The solenoid 25 has a plunger 28 which in its retracted (unactuated) state (solid line in FIG. 6) extends into the mounting plate 27 but in its extended (solenoid actuated) state (dotted line FIG. 6) extends through a corresponding bore 29 in the mounting plate 27 to prevent further axial movement of the sliding gate 22. Thus when sixth or seventh speeds are selected the gear lever 21 is moved out of the slot 9 and trapped between the spring-loaded plunger 20 and the respective face 26 of the sliding gate plate 22 (see also FIGS. 5 and 6). When the gear lever 21 is allowed to return to a central (neutral) position and is moved by the plunger 20 towards the centre of the gear box into notch 9 in the sliding gate plate 22, the micro-switches 24 are both unactuated, thereby releasing the solenoid lock 25 and causing the axle to change to the low ratio again. In order to render the micro-switches 24 and the solenoid 25 oil-proof they may be, for example, epoxy covered.

Figure 7:
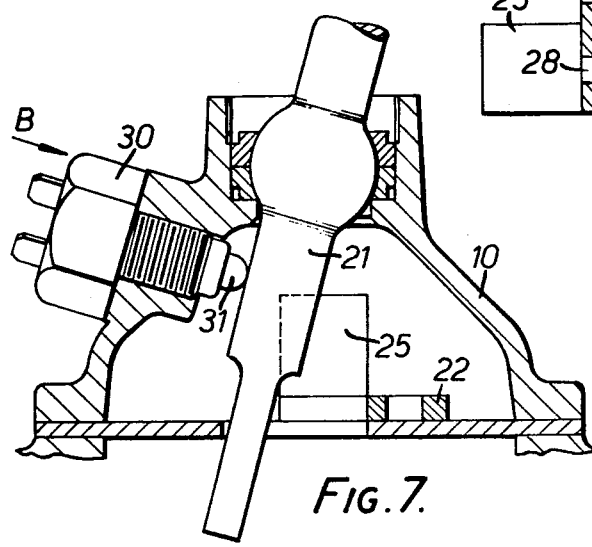
FIG. 7 shows a partial section corresponding to FIG. 4 and showing a modification.
Figure 8:
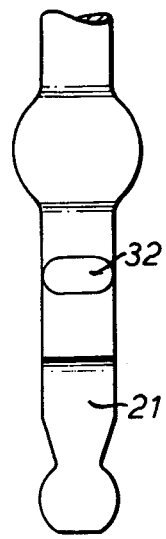
FIG. 8 shows a partial view in the direction of arrow B in FIG. 7.
Figure 9:
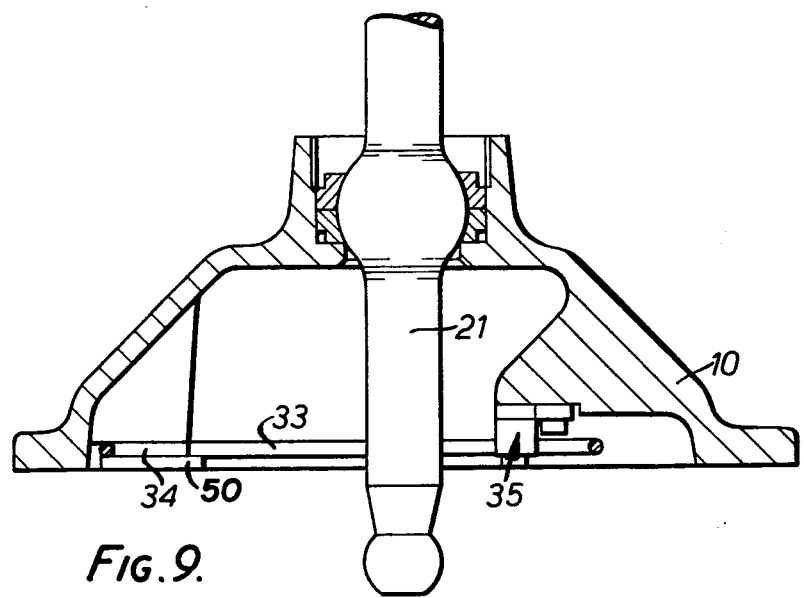
FIG. 9 shows a partial view corresponding to FIG. 8 and showing a modification.
Figure 10:
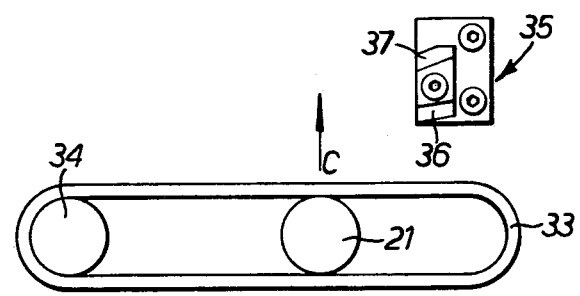
FIG. 10 shows a partial plan view from below of FIG. 9 with the spring clip disengaged from the ramps.
Figure 11:
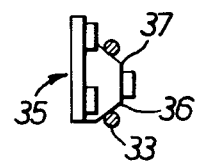
FIG. 11 shows a partial side section showing the spring clip engaged with the ramps.

In the modification shown in FIGS. 7 and 8 the micro-switches 24 are replaced by a switch 30 having a plunger 31. The switch 30 operates the axle ratio change when the plunger 31 is depressed by sideways movement of the gear lever 21 into the sixth/seventh position as in the FIGS. 4, 5 and 6 embodiment. A pad 32 on the gear lever 21 ensures that the plunger 31 remains depressed during axial movement of the lever 21 to engage 6th and 7th gear. The sliding gate plate 22 and the locking solenoid 25 are still required and operate as described with reference to FIGS. 4, 5 and 6. The switch 30 may be a modified reverse light switch. This arrangement of the switch has the advantage that it is basically external of the control housing 10 and can be more easily replaced than the micro-switches 24 of the FIGS. 4, 5 and 6 embodiment.

The arrangements so far described both require a sliding gate and solenoid lock and are thus relatively expensive. A further modification shown in FIGS. 9, 10 and 11 employs an external switch (not shown) similar to switch 30 of FIG. 7 and a closed spring link 33. The gear lever 21 is retained within the spring link 33, which is pivotable about a stud 32 with a retaining shoulder 50. The spring link 33 thus follows movement of the gear lever 21. To engage sixth or seventh speeds the gear lever 21 is first pushed in the direction of arrow C thereby depressing the plunger of the axle ratio change switch (not shown) and causing the link 33 to pivot about stud 34. In order to allow the gear lever to enter the sixth or seventh speed position the link 33 must ride up ramp 36 and become positioned as shown in section in FIG. 11 with the link 33 engaged on composite ramp member 35. In order to disengage the sixth and seventh positions and return to the low axle ratio the lever 21 must be moved to cause the link 33 to ride up a ramp 37 of the composite ramp member 35. Positioning of the link 33 on the ramp member 35 prevents the gear lever moving out of position when the driver releases the gear lever. The elongate shape of the link 33 permits movement of the lever 21 therein to engage either the fourth or fifth gear (sixth or seventh speeds, respectively).

Figure 12:
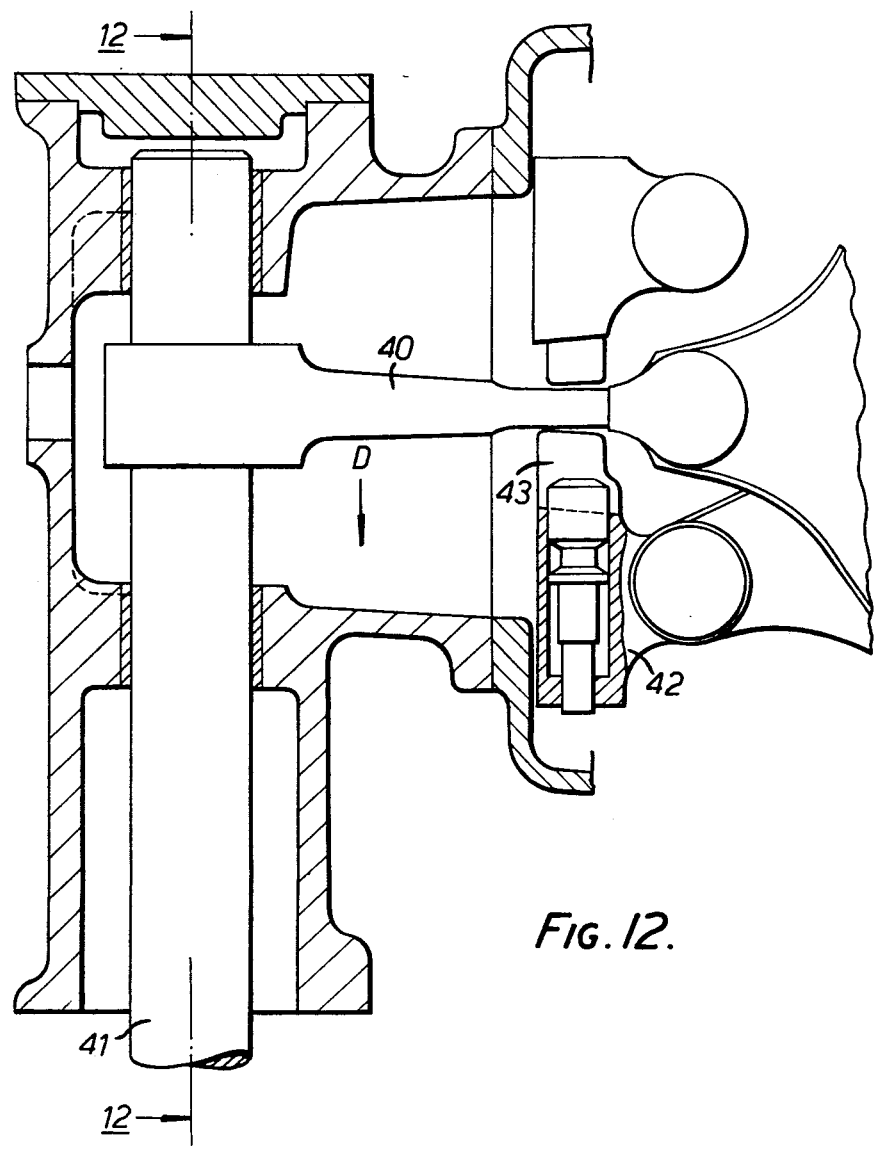
FIG. 12 shows a partial cross-section of a second embodiment of combined shift control for a change speed gear transmission and a two speed axle in accordance with the present invention.
Figure 13:
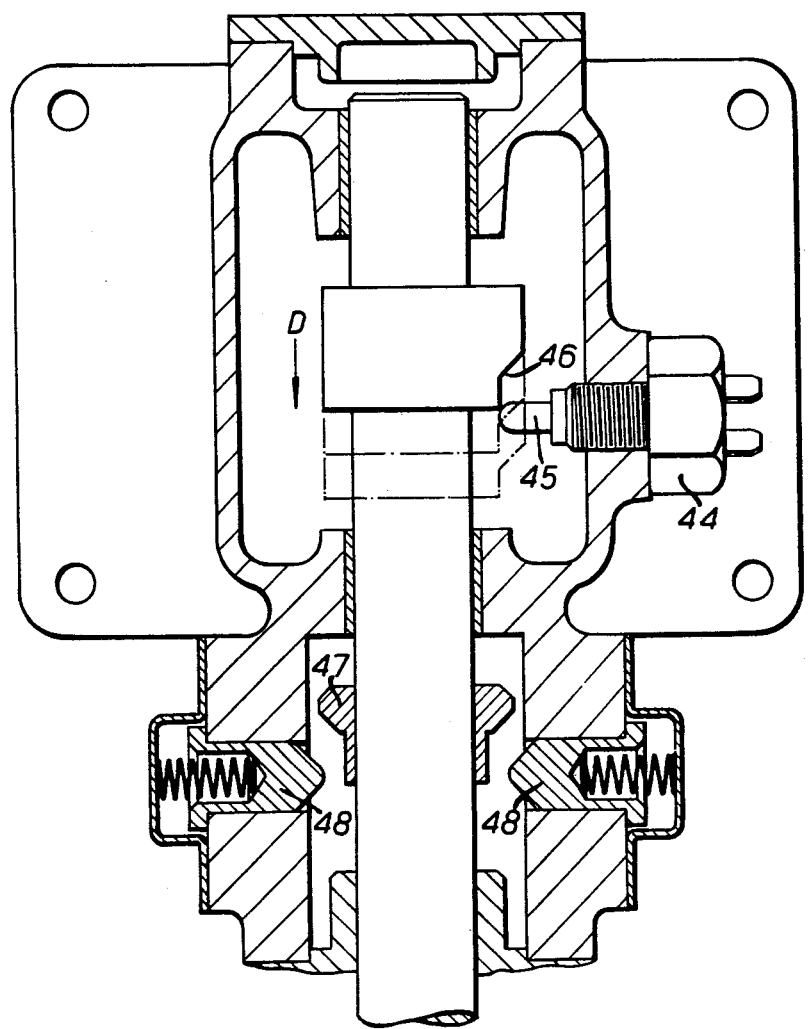
FIG. 13 shows a partial cross-section of the embodiment of FIG. 12 taken along the line 12—12.

The embodiment shown in FIGS. 12 and 13 is for use with a direct off set control or a remote control shift as compared with the direct gear lever control of the arrangements described above.

The reverse and first to fifth gears are selected in a conventional manner by means of a finger 40 which is controlled by a conventional slidable and rotatable cross shaft or rod 41. The shift rods and gear selector blocks are substantially as described with reference to the FIGS. 4, 5 and 6 arrangement, the gear selector block 42 for fourth/fifth gear having a deeper slot 43 than required for a conventional five speed gear box. Sideways movement of the rod 41 from the fourth/fifth to the sixth/seventh position (in the direction of arrow D) causes a plunger 45 of a switch 44 to run up a ramp 46 of the finger 40 and actuate the axle ratio change. The cam surfaces 47 fixed to the rod are at the same time caused to be positioned on the opposite side of respective spring-loaded gate plungers 48 to that shown in FIG. 13. The gate plungers 48 serve to retain the rod 41 and finger 40 in the sixth/seventh position until the rod is moved with sufficient force in the direction opposite to arrow D to overcome the spring loading of the plungers and return the axle ratio to the lower value by the resultant opening of switch 44.

In dependence on the attachments on the end of rod 41 this embodiment can be employed with direct offset shift control or remote shift control.

The embodiments described work as follows. A driver will change gear normally through the gearbox from first to fifth, he will then press the gear lever sideways against a spring resistance to engage the two high speeds, which are in fact the fourth and fifth speed transmission gears but with a higher axle ratio. Changing down follows the reverse sequence. The driver has no separate push-pull switches, levers or rotary valves to operate. The action of overcoming the spring resistance to engage the "higher" gears will automatically cause the axle to change to the higher range and will hold it in this range until the gear lever is deliberately moved back by the driver to the lower range.

The invention thus permits a five speed gear box to be extended to perform as a seven speed gear box with a minimum amount of modification to the selector mechanism itself.

Whilst the invention has been specifically described with reference to extending a five speed gear box to perform as a seven speed gear box, that is increasing the number of effective gears by two, alternatively it may be arranged that the number of effective gears is increased simply by one. In addition the same basic principle may be applied to effectively extend the range of other gear boxes, for example a three speed to a five speed gear box. A further alternative would comprise extending the range downwards rather than upwards. Thus reverse and first to fifth gear could be arranged as in FIG. 14 and be operable at a high axle speed, and a first speed operable at a low axle speed (1st L) would be obtainable by means of a deeper slot than usual in the first/reverse selector block and involve overcoming a spring resistance and operating a switch to change the axle speed in a similar manner to that described above with respect to FIGS. 4, 5 and 6 for example. Alternatively, the shift pattern of FIG. 14 could be modified to include a low reverse gear for maneuvering, that is making the reverse gear also operable at the low axle speed, thus effectively extending a conventional five speed gear box by two speeds in a downwards direction, rather than upwards as in FIG. 3. Such an arrangement may be achieved by effectively rotating certain elements of FIG. 4 through 180° and providing a modified mounting plate 27. These elements are gear lever 21 and selector blocks 15 and 17, and micro-switches 24, gate plate 22 and solenoid 25 mounted on plate 27. In the case of an extension by one gear only, the shape of aperture 27b in the mounting plate 27, in the FIG. 4 embodiment, would be such that the gear lever could only be moved to reselect one gear when a second axle speed is selected.

It is understood that the above description of the preferred embodiments is by way of example only and that various modifications, substitutions and/or rearrangements of the parts are possible without departing from the spirit and the scope of the present invention as hereinafter claimed.

I claim:

1. A combined shift control for a motor vehicle driveline comprising a change speed gear transmission connected in series with a two speed axle, said control comprising a gear transmission casing, at least two parallel shift rods each shiftable axially in the casing to select a gear ratio or gear ratios of the transmission, a selector finger pivotably mounted with respect to said casing, switch means mounted in the casing adapted to change the axle ratio between high and low values, wherein each shift rod carries a respective selector block having engagement faces engageable by the selector finger to axially shift the shift rods, wherein one selector block only is such that the selector finger can occupy a first or a second operational position with respect thereto, said first and second positions being adjacent without any operational position for engagement of the other selector block engagement faces interposed therebetween, movement of the selector finger between the two operational positions effective to control the switch means to change the axle ratio whereby the number of driveline gear ratios effectively selectable by the one selector block is increased by one or two, a spring-loaded plunger arranged in the one selection block for movement transverse to the shift rod axis to be overcome for movement of the selector finger between the first and second operational positions and means to retain the selector finger in the second operational position against the force of the spring-loaded plunger when the second position is selected, said means to retain comprising a gate plate adapted to slide in the casing with the selector finger upon movement thereof when the axle ratio is that associated with the first operational position, and arranged to be locked in position in the casing when the selector finger is in the second operational position whereby the selector finger is retained beween the spring-loaded plunger and a respective axially extending face of the gate plate.

2. A combined shift control as claimed in claim 1 wherein the gate plate is locked in position by means of a solenoid plunger actuated by the switch means upon movement of the selector finger between the first and second operational positions.

3. A combined shift control for a motor vehicle driveline comprising a change speed gear transmission and a two speed axle, said control comprising a gear transmission casing, at least two parallel shift rods each shiftable axially in the casing to select a gear ratio or gear ratios of the transmission, a selector finger pivotably mounted relative to said casing, switch means mounted in the casing adapted to change the axle ratio between high and low values, wherein each shift rod carries a respective selector block having engagement faces engageable by the selector finger to axially shift the shift rods, wherein one selector block is such that the selector finger can occupy a first or a second operational position with respect thereto, and wherein movement of the selector finger between the two operational positions is effective to control the switch means to change the axle ratio whereby the number of driveline gear ratios effectively selectable by the one selector block is increased by one or two, a spring-loaded plunger arranged in the one selector block for movement transverse to the shift rod axis to be overcome for movement of the selector finger between the first and second operational positions and retaining means to retain said selector finger in the second operational position thereof when said second position is selected, said retaining means comprising a gate plate adapted to slide in the casing with the selector finger upon movement thereof when the axle ratio is that associated with the first operational position, and arranged to be locked in position in the casing when the selector finger is in the second operational position whereby the selector finger is retained between the spring-loaded plunger and a respective axially extending face of the gate plate.

4. A combined shift control as claimed in claim 3, wherein the gate plate is locked in position by means of a solenoid plunger actuated by the switch means upon movement of the selector finger between the first and second operational positions.

5. A combined shift control as claimed in any one of claims 3 or 4, wherein the switch means comprises a pair of micro-switches mounted in the casing to be actuated by the selector finger upon movement relative to the one selector block in the second operational position, each micro-switch being associated with a respective effective additional gear ratio.

6. A combined shift control as claimed in any one of claims 3 or 4, wherein the switch means comprises a plunger actuated switch operable by the selector finger upon movement relative to the one selector block in the second operational position.

7. A combined shift control as claimed in claim 3, wherein an elongate spring clip pivotally mounted at one end to the casing and through which the selector finger extends serves to restrict movement of the selector finger, wherein in order to move the selector finger from the first operational position to the second operational position the spring clip is driven up a first ramp of a ramp member upon which it is then retained maintaining the selector finger in the second operational position, until in order to move the selector finger from the second operational to the first operational position the spring clip is driven up a second ramp of the ramp member by movement of selector finger.

8. A combined shift control as claimed in claim 3, wherein the selector finger is carried on a cross shaft mounted in the casing, transversely of the shift rods, for axial sliding movement to and fro in the direction of its longitudinal axis and for rotational movement in both directions about its longitudinal axis, wherein movement of the selector finger between the first and second operational positions is associated with a corresponding axial sliding movement of the cross shaft and wherein during which axial sliding a formation of the cross shaft and movable therewith serves to operate a plunger of the switch means.

* * * * *